US008533301B2

(12) United States Patent
Liebsch et al.

(10) Patent No.: US 8,533,301 B2
(45) Date of Patent: Sep. 10, 2013

(54) METHOD FOR CONTROLLING PROXY BINDING OF A MOBILE NODE

(75) Inventors: Marco Liebsch, Heidelberg (DE); Long Le, Dossenheim (DE)

(73) Assignee: NEC Europe Ltd., Heidelberg (DE)

( * ) Notice: Subject to any disclaimer, the term of this patent is extended or adjusted under 35 U.S.C. 154(b) by 417 days.

(21) Appl. No.: 12/679,118

(22) PCT Filed: Sep. 19, 2008

(86) PCT No.: PCT/EP2008/007909
§ 371 (c)(1),
(2), (4) Date: May 7, 2010

(87) PCT Pub. No.: WO2009/036993
PCT Pub. Date: Mar. 26, 2009

(65) Prior Publication Data
US 2010/0223365 A1    Sep. 2, 2010

(30) Foreign Application Priority Data
Sep. 19, 2007  (EP) .................................... 07018426

(51) Int. Cl.
*G06F 15/177*      (2006.01)
(52) U.S. Cl.
USPC ............ 709/221; 709/220; 709/222; 709/225
(58) Field of Classification Search
USPC .................. 709/221, 220, 222, 225
See application file for complete search history.

(56) References Cited

U.S. PATENT DOCUMENTS

| 6,985,463 | B1 * | 1/2006 | Wright et al. ................. 370/331 |
| 7,539,164 | B2 * | 5/2009 | Maenpaa et al. .............. 370/331 |
| 2001/0046223 | A1 * | 11/2001 | Malki et al. .................... 370/338 |
| 2009/0016364 | A1 * | 1/2009 | Krishnan ....................... 370/401 |

FOREIGN PATENT DOCUMENTS

KR    10 2007-0061296 A    6/2007

OTHER PUBLICATIONS

Mueller, et al. "Network-based Mobility with Proxy Mobile IPv6." IEEE 18th International Symposium on Person, Indoor, and Mobile Radio Communcations. Sep. 3-7, 2007, pp. 1-5.*
Korean Office Action, dated Nov. 28, 2011, from corresponding Korean application.
Liebsch, M., et al, "Inter-Technology Handover for Proxy MIPv6; draft-liebsch-netlmm-inter tech-proxymip6ho-01.txt", IETF Standard-Working-Draft, Internet Engineering Task Force, IETF, CH, No. 1, Feb. 25, 2008, XP015054267, ISSN: 0000-0004, pp. 1-23.
Christian M. Mueller et al., "Network-based Mobility with Proxy Mobile IPv6", IEEE International Symposium on Personal; Indoor and Mobile Radio Communications, PIMRC, IEEE; PI, XX, Sep. 1, 2007, XP031168876, ISBN: 978-1-4244-1143-6, pp. 1-5.

(Continued)

*Primary Examiner* — Nicholas Taylor
(74) *Attorney, Agent, or Firm* — Young & Thompson

(57) ABSTRACT

A method for controlling proxy binding of a mobile node in a network that supports network-based mobility management, wherein the mobile node includes at least one network interface that is employed for attaching to the network via an access router, wherein a mobile node's binding for a network interface is initiated by a binding request, is characterized in that the mobile node's binding for a new network interface is qualified as a preliminary binding, which is not employed for downlink data transmission, and that the mobile node's preliminary binding is activated, after the mobile node's new network interface has been configured.

23 Claims, 2 Drawing Sheets

(56) References Cited

OTHER PUBLICATIONS

Figure 1:
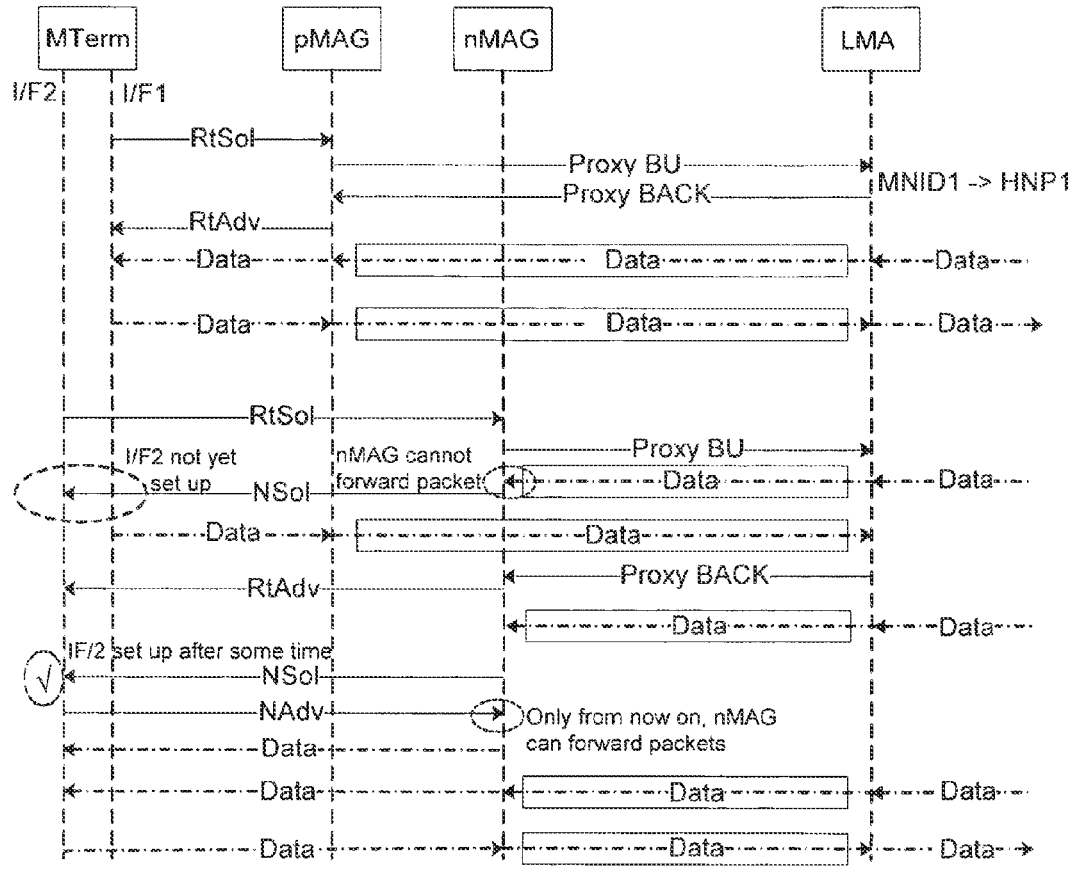

Gundavelli, S. et al., "Proxy Mobile IPv6; draft-ietf-netlmm-proxymip6-05.txt", IETF Standard-Working-Draft, Internet Engineering Task Force, IETF, CH, vol. netlmm, No. 5, Sep. 14, 2007, XP015051494, ISSN: 0000-0004.

International Search report dated Feb. 16, 2009, from corresponding PCT application.

* cited by examiner

METHOD FOR CONTROLLING PROXY BINDING OF A MOBILE NODE

The present invention relates to a method for controlling proxy binding of a mobile node in a network that supports network-based mobility management, wherein the mobile node includes at least one network interface that is employed for attaching to the network via an access router, wherein a mobile node's binding for a network interface is initiated by a binding request.

As what regards mobility and reachability of mobile nodes in a network, in general, two different solutions are currently available. Firstly, there are mobile nodes that support a mobility management protocol and that, consequently, perform their mobility management autonomously. For instance, in environments employing Mobile IPv6, these mobile nodes inform a local mobility anchor implemented in the network on their own about the network cell they are currently located in and about their current address under which they can be reached.

A second solution is available for mobile nodes that do not support any mobility management protocol. The IETF is discussing and specifying solutions for network-based localized mobility management (netlmm), providing mobility to such nodes. Compared to well known mobility protocols, such as Mobile IPv6, solutions for netlmm relocate client control functions for mobility management from the mobile node to the network's access router. Hence, the mobile node is not involved in any mobility related signalling and just performs functions to attach to the network, which will be processed by the network to signal the mobile node's presence/location to the mobility management system.

Recently, the Proxy Mobile IPv6 protocol has been selected as protocol base for netlmm. To set up a state for a mobile node in Proxy MIPv6, the access router being used by a mobile node sends a Proxy Binding Update to the mobility management system, indicating the mobile node's location. As a reply, the access router receives a Proxy Binding Acknowledgement along with configuration data (network prefix for address configuration, etc.) for the mobile node. Configuration data will be forwarded to the mobile node to finalize setting up the attached interface and to start using the new link.

In case of an inter-radio access technology (inter-RAT) handover, the mobile terminal attaches to the new access router using a new network interface, which triggers the access router to send a Proxy Binding Update to the mobility management system according to the Proxy Mobile IPv6 procedure. From that moment the mobility management system forwards downlink packets to the mobile node's new location and new interface immediately.

However, this procedure can cause problems, as it might happen that the new interface or the associated access link/radio bearer is not yet readily set up and configured when the first downlink packets arrive. As address validation and configuration might introduce additional delay to set up the new interface, inter-RAT handover might experience packet loss during the set up of a new interface. The same problems can occur in case of multi-attached/multi-homed mobile nodes, i.e. mobile nodes, which are attached to a network-based mobility domain, such as Proxy Mobile IPv6, through multiple network interfaces simultaneously.

It is therefore an object of the present invention to improve and further develop a method for controlling proxy binding of a mobile node in a network of the initially described type in such a way that, by employing mechanisms that are readily to implement, packet losses during the configuration procedure of a new network interface or the setup of an associated access link/radio bearer are significantly reduced.

In accordance with the invention, the aforementioned object is accomplished by a method comprising the features of claim 1. According to this claim such a method is characterized in that the mobile node's binding for a new network interface is qualified as a preliminary binding, which is not employed for downlink data transmission, and that said mobile node's preliminary binding is activated, after said mobile node's new network interface has been configured.

According to the invention it has first been recognized that a configuration procedure of a mobile node's network interface takes a certain time period. More specifically, address validation and configuration to set up the new interface introduce some delay, the delay being on a scale long enough to cause problems with respect to a loss of downlink packets. Furthermore, according to the invention it has been recognized that these problems can be efficiently avoided by qualifying a mobile node's binding for a new network interface as a preliminary binding. Preliminary means that the new network interface is not employed for downlink date transmission until the new network interface has been completely configured. After being configured, the mobile node's binding, which has been classified as preliminary beforehand, is activated. This means that downlink packets are forwarded to the mobile node through its new—properly configured—network interface.

The method according to the present invitation is particularly effective in that it guarantees that the location of the mobile node's new network interface is known to the mobility management system while downlink packets are still forwarded according to the mobile node's previously known state and associated location information. The mobility management system starts using the mobile node's new location states only after the new network interface is properly set up and ready to send and receive data. Thus, packet losses in case a mobile node performs an inter-RAT handover in a network-based mobility domain, such as Proxy Mobile IPv6, are reduced.

It is to be noted that the method according to the present invention not only applies for inter-RAT handovers, but also for multi-attached/multi-homed mobile nodes, i.e. mobile nodes that are attached to a network-based mobility domain through multiple network interfaces simultaneously. In such case, the term "new network interface" refers to an interface which is newly configured but which is active at the same time a previously set up interface is employed, i.e. the previous and the new network interface are used in parallel.

According to a preferred implementation, a mobile node's attachment to an access router triggers a binding request on a mobility access gateway function which is implemented on that access router. In case the mobile node activates a new (different or additional) network interface, that activation may trigger a binding request on a mobility access gateway function implemented on the associated new access router. For instance, a binding request may be performed by means of a Proxy Binding Update message according to the Proxy Mobile IPv6 protocol.

Advantageously, binding requests are forwarded to a mobility anchor implemented in the network. Upon receipt of the binding request, the mobility anchor may assign a home network prefix to the mobile node for address configuration. These mobile node's configuration data may be forwarded to the mobile node via the associated mobility access gateway function. It is to be noted that the mobile node, by employing the received configuration data, can set up its new network interface properly. During this time the mobile node does not have to suspect to loose downlink packets, as the binding for the new network interface being under configuration is set to "preliminary" at the mobility anchor and is thus not yet employed for downlink data transmission.

As what regards a reliable informing of the mobility anchor about a mobile node's intention to employ a new network interface, two different approaches prove to be beneficial. According to a first embodiment, it may be provided that the mobility access gateway identifies that the mobile node attaches with a new network interface and informs the mobility anchor accordingly. In this case the mobility access gateway function itself can already assign the mobile node's binding the status "preliminary". Besides it is possible that the mobility access gateway function just informs the mobility anchor of the mobile node's attachment with a new network interface, whereas the qualification of the binding as preliminary binding is then performed by the mobility anchor.

According to an alternative embodiment, it may be provided that the mobility anchor, upon receipt of a mobile node's binding request that does not include any further information about whether the binding request belongs to an initial attachment or to an attachment with a different/additional interface, checks whether that mobile node has a registration at the mobility anchor. According to this embodiment, it may be further provided that the mobility anchor, in case the performed check reveals that the mobile node has a registration at the mobility anchor already, qualifies the mobile node's binding as a preliminary binding.

With respect to a proper and efficient employment of the new network interface, it may be provided that a qualification of a mobile node's binding as preliminary binding is indicated to the respective mobility access gateway function. To this end, a proxy binding acknowledge message may be employed.

Furthermore, it may be provided that the mobile node informs the mobility access gateway function as soon as the mobile node's new network interface is set up completely. Upon being so informed, in a next step the mobility access gateway function may send a signalling message to the mobility anchor for activating the preliminary binding. The activation of a preliminary binding may also be effected by means of proxy binding update message or, alternatively, by means of a different indication, e.g. a local timeout event on the mobility anchor.

After activation of the preliminary binding, it may be provided that the mobility anchor forwards downlink packets towards the mobile node through the mobile node's new network interface and via the associated new mobility access gateway. As what concerns forwarding of downlink packets before activation of the preliminary binding, two embodiments prove to be particularly beneficial. According to a first embodiment, the mobility anchor may forward downlink packets towards the mobile node through the mobile node's previous network interface via the associated previous mobility access gateway. In other words, the mobility anchor continues forwarding packets according to the previous binding state. According to an alternative embodiment, downlink packets, before activation of the preliminary binding, may be buffered at the new access router, i.e. the access router to which the mobile node is attached via its new network interface.

With respect to an efficient mobile node's uplink communication, it may be provided that the mobility anchor, while the mobile node's binding with the new mobility access gateway is qualified as preliminary binding, is configured to accept uplink packets both from the mobile node's previous as well as from its new mobility access gateway for forwarding into the network infrastructure.

With respect to an easy generation and control of preliminary and activated binding states, it may be provided that both the qualification of a mobile node's binding as preliminary as well as the activation of a preliminary binding are performed by means of a flag which is set in the headers of the respective signalling messages. However, such identification is lifetime static. To achieve a lifetime flexible identification, a message option may be appended to the signalling messages, which indicates that a binding state is preliminary or activated. In particular, it may be provided that the presence of such option signals the status "preliminary", whereas not attaching the option to the message signals activation of the binding. The option may include various fields, like e.g. type, length, lifetime, etc. Both with a flag-related as well with an option-related operation, a minimal extension to existing signalling and state machines is required rendering the method standard and product extension friendly.

In order to assure a smooth operation, in case the mobility anchor does not receive any information regarding the successful termination of a mobile node's new network configuration, it may activate the binding of the mobile node's new network interface on its own. To this end a waiting time period may be predefined that serves as a time out.

According to a preferred embodiment, the mobile node's attachment to an access router includes the router discovery procedure. In such case the Router Solicitation message (RtSol) may serve as a trigger for the mobility access gateway to send a binding update to the mobility anchor.

According to a further preferred embodiment, when setting up a new network interface, the mobile node may perform a duplicate address detection procedure. In such case, the Neighbour Solicitation message (NSol) may be employed as signalling that indicates to the new mobility access gateway the completion of the mobile node's new interface setup.

There are several ways how to design and further develop the teaching of the present invention in an advantageous way. To this end, it is to be referred to the patent claim subordinate to patent claim 1 on the one hand, and to the following explanation of a preferred example of an embodiment of the invention illustrated by the drawing on the other hand. In connection with the explanation of the preferred example of an embodiment of the invention by the aid of the drawing, generally preferred embodiments and further developments of the teaching will be explained. In the drawing FIG. 1 illustrates an example of a new network interface configuration in case of inter-RAT mobility according to the state of the art, and FIG. 2 illustrates signalling and data flow with respect to a new network interface configuration with preliminary binding according an embodiment of the present invention.

Figure 2:
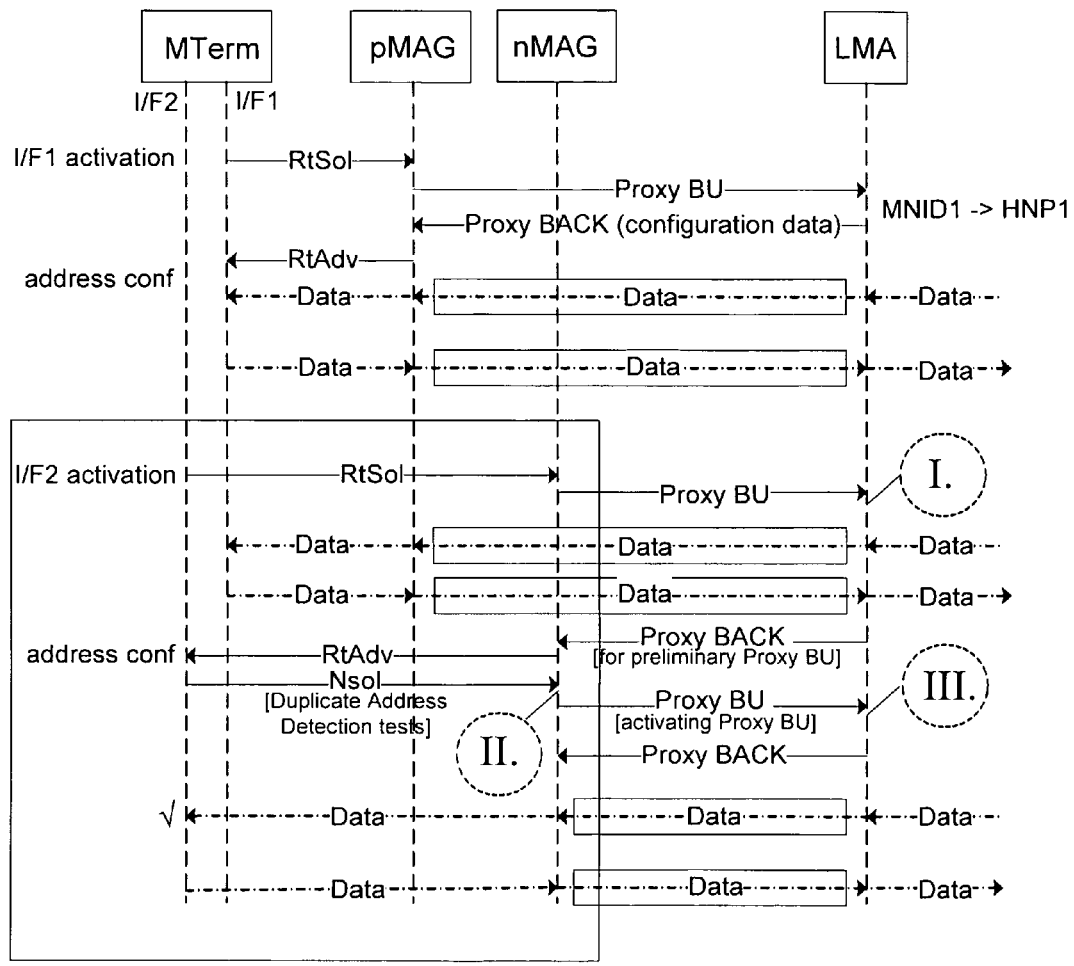

Although the method according to the present invention is applicable with network-based mobility management in general, the scenarios shown in FIGS. 1 and 2 refer to the current standard protocol Proxy Mobile IPv6 as example. It is to be noted that the issues described may apply to any other protocol solution for network-based mobility management.

Referring to the components of Proxy Mobile IPv6, the access router comprises the Proxy Mobile IPv6 Mobility Access Gateway (MAG), whereas the Local Mobility Anchor (LMA) maintains the binding(s) for mobile nodes in the network. In case a mobile node attaches to the access router, the MAG sends the Proxy Binding Update (PBU) message to the LMA. The LMA replies by means of a Proxy Binding Acknowledge (PBA) message, comprising the mobile node's configuration data, as required exemplarily for address configuration.

This behaviour is illustrated in FIG. 1, which depicts a state of the art example of a mobile node configuring a new network interlace in case of inter-RAT mobility. More specifically, a mobile terminal (MTerm) attaches to an access router with network interface 1 (I/F 1). The access router implements the terminal's MAG, which is referred to as previous MAG (pMAG). Attachment is indicated in the example by means of the Router Discovery procedure. The reception of the Router Solicitation (RtSol) serves as trigger for the pMAG to send the Proxy Binding Update (Proxy BU) to the LMA. The LMA assigns a Home Network Prefix 1 (HNP1) to the mobile terminal, which is used by the mobile terminal for address configuration. The access router advertises the HNP1 with the Router Advertisement (RtAdv) and the mobile terminal configures its IP address according to the received HNP1.

If the mobile terminal activates its new interface (I/F 2), the associated router discovery procedure triggers the Proxy Binding Update in the nMAG. According to the Proxy Mobile IPv6 specification (as specified in S. Gundavelli et al, "Proxy Mobile IPv6", draft-ietf-netlmm-proxymip6-03.txt, work in progress, September 2007, available from http://www.ietf.org/internet-drafts/draft-ietf-nelmm-proxymip6-03.txt), the LMA updates the mobile terminal's binding as soon as it received the Proxy Binding Update from the nMAG and starts forwarding packets towards the mobile terminal through nMAG and the mobile terminal's new interface (I/F 2).

As the new interface might take more time to be ready for packet reception, it won't reply to Neighbor Solicitation (NSol) requests for address resolution from the nMAG, which is required to forward packets to the mobile terminal, as exemplarily depicted in FIG. 1. During this time, downlink packets, which cannot be forwarded to the mobile terminal's new interface, might be dropped. This will cause packet loss during an inter-RAT handover. It is to be noted that until the mobile terminal has completely set up the new interface, it might decide to send uplink packets through its previous interface (I/F 1), as illustrated in FIG. 1.

FIG. 2 exemplarily illustrates a case of inter-technology handover according to the invention. A mobile terminal (MTerm) attaches to an access router with network interface 1 (I/F 1). The access router implements the terminal's MAG, which is again referred to as previous MAG (pMAG). Attachment in the example is again indicated by means of the Router Discovery procedure. Alternative mechanisms and indication to trigger a Proxy Binding Update on an access router's MAG function are possible, e.g. radio technology specific trigger on layer 2. The reception of the Router Solicitation (RtSol) serves as trigger for the pMAG to send the Proxy Binding Update (Proxy BU) to the LMA. The LMA assigns Home Network Prefix 1 (HNP1) to the mobile terminal for address configuration. The access router advertises the HNP1 with the Router Advertisement (RtAdv) and the mobile terminal configures its IP address according to the received HNP1. Based on this binding, downlink data received at the LMA are tunnelled and forwarded to the pMAG where the data is de-encapsulated and forwarded to MTerm's I/F 1. Reversely, uplink packets are forwarded from the MTerm to the pMAG where they are tunnelled and forwarded to the LMA. At the LMA the encapsulation of data packets is removed and the packets are further routed into the infrastructure.

If the mobile terminal activates its new interface (I/F 2), the associated router discovery procedure triggers the Proxy Binding Update in the nMAG. In this example, as indicated by the dashed line circle with reference number I., the LMA identifies new technology. More specifically, the LMA recognizes that the associated mobile terminal has a registration at the LMA already, but attaches with a new interface, which might not yet be configured. Hence, the LMA classifies the new binding as preliminary and indicates this to the nMAG in the Proxy Binding Acknowledge.

Due to the qualification of the binding as preliminary, the LMA continues to use the pMAG for downlink packet forwarding. This means that the LMA's Binding Cache (BC) temporarily contains two forwarding entries in the Binding Cache Entry (BCE) of the mobile terminal MTerm. As a further consequence, during the time period with two forwarding entries for the MTerm, the LMA accepts uplink packets from both MAGs, pMAG and nMAG, i.e. from both MTerm's interfaces I/F 1 and I/F 2, and routes them into the infrastructure. The BCE may include the MTerm's ID (which is always constant), the valid IP address, forwarding information (i.e. the addresses of the respective MAGs). As a further option, the BCE may include information regarding the access technologies currently employed by the MTerm.

In a next step, the nMAG retrieves the mobile terminal's configuration data from the Proxy Binding Acknowledge message and sends a Router Advertisement RtAdv message to the mobile terminal MTerm. The mobile terminal MTerm, on the basis of the address configuration data received with the RtAdv message, starts performing tests required for proper configuration of the new interface I/F 2. Alternatively, depending on the specific technology, the mobile terminal MTerm or the network infrastructure may start to establish the Radio Bearer.

In any case, the nMAG receives an indication, such as for example Neighbor Solicitation (NSoI) signalling, from the mobile terminal's duplicate address detection procedure, once the mobile terminal's interface has been set up completely. At this point, indicated by the dashed line circle with reference number II., the network learns about the completely set up I/F 2. The nMAG sends a further signalling message to the LMA to activate the binding for the new interface. In the specific example shown in FIG. 2, the nMAG uses a further Proxy Binding Update message to control the activation of the associated binding at the LMA: As indicated by the dashed line circle with reference number III., the LMA activates the binding, or, in other words, switches the status of the binding from "preliminary" to "activated". Moreover, from now on the LMA forwards packets towards the mobile terminal through the nMAG and the mobile terminal's new interface I/F 2.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. Method for controlling proxy binding of a mobile node in a network that supports network-based mobility management, wherein the mobile node is under network-based mobility management and includes at least one network interface that is employed for attaching to the network via an access router, wherein the mobile node's binding for a network interface is initiated by a binding request, comprising qualifying the mobile node's binding for a new network interface as a preliminary binding, which is not employed for downlink data transmission, and switching a status of said mobile node's binding from preliminary to activated, after said mobile node's new network interface has been configured, so that from then on a mobility anchor forwards downlink packets towards said mobile node through said mobile node's new network interface via an associated mobility access gateway.

2. Method according to claim 1, wherein the mobile node's attachment to said access router triggers a binding request on a mobility access gateway function implemented on said access router.

3. Method according to claim 1, wherein the mobile node's activation of said new network interface triggers a binding request on a mobility access gateway function implemented on the associated new access router.

4. Method according to claim 1, wherein said binding requests are performed by means of a Proxy Binding Update message.

5. Method according to claim 2, wherein said binding requests are forwarded to a mobility anchor implemented in said network.

6. Method according to claim 5, wherein said mobility anchor, upon receipt of a mobile node's binding request, assigns a home network prefix to said mobile node for address configuration.

7. Method according to claim 6, wherein the mobile node's configuration data is forwarded to said mobile node via said mobility access gateway function.

8. Method according to claim 5, wherein said mobility access gateway identifies that said mobile node attaches with a new network interface and informs said mobility anchor accordingly.

9. Method according to claim 5, wherein said mobility access gateway, upon identifying that said mobile node attaches with a new network interface, qualifies the mobile node's binding as preliminary binding.

10. Method according to claim 5, wherein said mobility anchor, upon receipt of a mobile node's binding request, checks whether that mobile node has a registration at said mobility anchor.

11. Method according to claim 10, wherein said mobility anchor, in case said check reveals that the mobile node has a registration at said mobility anchor already, qualifies the mobile node's binding as preliminary binding.

12. Method according to claim 2, wherein a qualification of a mobile node's binding as preliminary binding is indicated to the respective mobility access gateway function.

13. Method according to claim 2, wherein said mobile node informs said mobility access gateway function as soon as said mobile node's new network interface is set up completely.

14. Method according to claim 13, wherein said mobility access gateway function, upon being informed that said mobile node's new network interface has been configured, sends a signalling message to a mobility anchor implemented in said network for activating said preliminary binding.

15. Method according to claim 1, wherein the activation of said preliminary binding is performed by means of a proxy binding update.

16. Method according to claim 5, wherein said mobility anchor, after activation of said preliminary binding, forwards downlink packets towards said mobile node through said mobile node's new network interface via the associated mobility access gateway.

17. Method according to claim 5, wherein said mobility anchor, before activation of said preliminary binding, forwards downlink packets towards said mobile node through said mobile node's previous network interface and via the associated previous mobility access gateway.

18. Method according to claim 5, wherein downlink packets, before activation of said preliminary binding, are buffered at said new access router to which said mobile node is attached via its said new network interface.

19. Method according to claim 5, wherein said mobility anchor accepts uplink packets from both the mobile node's previous as well as its new mobility access gateway for forwarding into the network infrastructure if the mobile node's binding with the new mobility access gateway is preliminary.

20. Method according to claim 1, wherein both the qualification of a mobile node's binding as preliminary as well as the activation of said preliminary binding are performed by means of a flag and/or the presence or absence of an option in the respective signalling message.

21. Method according to claim 5, wherein said mobility anchor, in case it does not receive any information regarding the configuration of the mobile node's new network within a predefined time period after receiving said mobile node's binding request, activates said binding of said mobile node's new network interface on its own.

22. Method according to claim 1, wherein the mobile node's attachment to said access router includes a Router Discovery procedure.

23. Method according to claim 1, wherein said mobile node, when setting up said new network interface, performs a duplicate address detection procedure.

* * * * *

UNITED STATES PATENT AND TRADEMARK OFFICE
CERTIFICATE OF CORRECTION

PATENT NO.        : 8,533,301 B2
APPLICATION NO.   : 12/679118
DATED             : September 10, 2013
INVENTOR(S)       : Liebsch et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 537 days.

Signed and Sealed this
Fifteenth Day of September, 2015

Michelle K. Lee
*Director of the United States Patent and Trademark Office*